US007970185B2

(12) United States Patent
Kim et al.

(10) Patent No.: US 7,970,185 B2
(45) Date of Patent: Jun. 28, 2011

(54) APPARATUS AND METHODS FOR CAPTURING A FINGERPRINT

(75) Inventors: Sung-Jae Kim, Suwon-si (KR); Jai-Hie Kim, Seoul (KR); Sang-Hoon Lee, Seoul (KR); Chul-Han Lee, Seoul (KR)

(73) Assignees: Samsung Electronics Co., Ltd., Gyeonggi-do (KR); Educational Foundation of Yonsei University, Seoul (KR)

( * ) Notice: Subject to any disclaimer, the term of this patent is extended or adjusted under 35 U.S.C. 154(b) by 1251 days.

(21) Appl. No.: 11/472,371

(22) Filed: Jun. 22, 2006

(65) Prior Publication Data

US 2007/0047783 A1     Mar. 1, 2007

(30) Foreign Application Priority Data

Aug. 29, 2005    (KR) ........................ 10-2005-0079269

(51) Int. Cl.
*G06K 9/00*     (2006.01)
(52) U.S. Cl. ...................................... 382/124
(58) Field of Classification Search ........... 382/118–127
See application file for complete search history.

(56) References Cited

U.S. PATENT DOCUMENTS

| 6,128,003 | A * | 10/2000 | Smith et al. | 345/157 |
| 2003/0076986 | A1 * | 4/2003 | Yoon et al. | 382/125 |
| 2004/0001634 | A1 * | 1/2004 | Mehrotra | 382/232 |
| 2004/0130546 | A1 * | 7/2004 | Porikli | 345/423 |
| 2005/0117785 | A1 * | 6/2005 | Boshra | 382/124 |

FOREIGN PATENT DOCUMENTS

| JP | 2003-030629 | 1/2003 |
| JP | 2003-248830 | 9/2003 |
| KR | 10-2003-0019788 | 3/2003 |

OTHER PUBLICATIONS

Multimedia Cyberspace Journal. Special Issue on Pattern Recognition in Biometrics and Bioinformatics. vol. 3, No. 3 (2005). http://www.cyberscape.mmu.edu.my.

* cited by examiner

*Primary Examiner* — Vikkram Bali
*Assistant Examiner* — Elisa M Rice
(74) *Attorney, Agent, or Firm* — Harness, Dickey & Pierce, P.L.C.

(57) ABSTRACT

An apparatus and methods for capturing a fingerprint are provided. In a first example method, first fingerprint image may be obtained in a guard region within a captured image, the guard region including less than all of the captured image. A fingerprint region may be extracted from the captured image based on a predicted color distribution, the predicted color distribution based on color information associated with the first fingerprint image, the extracted fingerprint region including the first fingerprint image within the guard region and at least a portion of the fingerprint region extending beyond the guard region within the captured image. In a second example method, guard region may be defined within a picture boundary area, the defined guard region including less than all of the picture boundary area. At least one image may be captured, the captured image spanning the picture boundary area. Information associated with the captured image may be extracted from within the guard region. Portions of the captured image associated with a user's fingerprint may then be extracted based on the extracted information, the identified portions including a first portion within the guard region of the captured image and a second portion within the picture boundary area of the captured image outside of the guard region. In another example, an apparatus may be configured to perform either of the above-described first and second example methods.

29 Claims, 7 Drawing Sheets

APPARATUS AND METHODS FOR CAPTURING A FINGERPRINT

PRIORITY STATEMENT

This application claims the benefit of Korean Patent Application No. 10-2005-0079269, filed on Aug. 29, 2005, in the Korean Intellectual Property Office, the disclosure of which is incorporated herein in its entirety by reference.

BACKGROUND OF THE INVENTION

1. Field of the Invention

Example embodiments of the present invention relate generally to an apparatus and methods for capturing a fingerprint, and more particularly to an apparatus and methods for capturing a fingerprint based on information extracted from a guard region of a captured image.

2. Description of the Related Art

A fingerprint is a distinctive characteristic of an individual. Generally, each person may have a different fingerprint pattern which typically does not change during the life of the person. Accordingly, fingerprints may be a useful tool for identification. For example, conventional security systems, such as financial transaction systems, may deploy fingerprint scanners connected to fingerprint recognition systems for identifying and authenticating people seeking access to protected services.

A conventional fingerprint recognition system may store a fingerprint image of an individual obtained via a fingerprint acquisition apparatus (e.g., a fingerprint scanner). The conventional fingerprint recognition system may perform fingerprint recognition by comparing the fingerprint image with a stored fingerprint. During the comparison, the fingerprint recognition system may extract fingerprint characteristics from the obtained fingerprint image and may compare the extracted fingerprint characteristic with a fingerprint characteristic of the stored fingerprint image.

Conventionally, a process of extracting a fingerprint characteristic from a fingerprint image may include extracting a fingerprint region from the fingerprint image, extracting a ridge direction and a frequency from the fingerprint region, enhancing the quality of the fingerprint image, and binarizing and thinning the fingerprint image with the enhanced quality. For example, the process of extracting the fingerprint region may be performed to separate the fingerprint region from a background region. The ridge direction of the fingerprint may be obtained by extracting the direction of a ridge. The ridge direction may include information used in an overall fingerprint recognition algorithm. For example, a conventional fingerprint recognition algorithm may include a process of searching for singular points (e.g., core, delta, etc.), a ridge enhancement process, and a classification process. A gradient of a fingerprint image may also be used to aid in the ridge direction extraction.

Figure 1A:
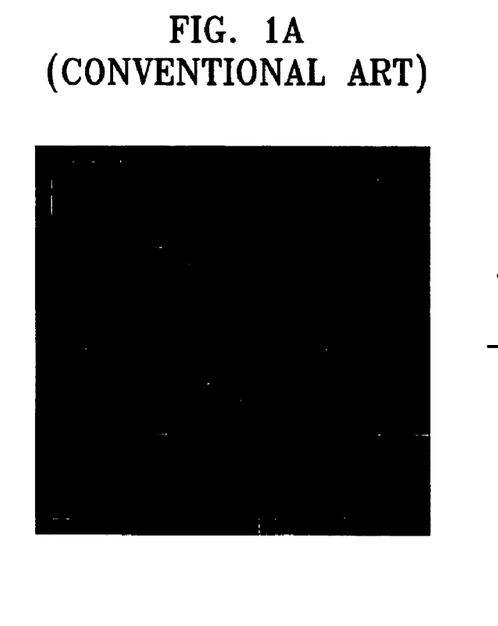
FIG. 1A illustrates a conventional block of a fingerprint image.

A fingerprint image may be divided into a plurality of non-overlapping blocks. FIG. 1A illustrates a conventional block of a fingerprint image. The gradient (Gx, Gy) of each block (e.g., such as illustrated in FIG. 1A) may be obtained by using a Sobel operator. The ridge direction for each block may also be obtained by using the gradient (Gx, Gy) by applying a series of calculations, described below with respect to Equations 1 through 6:

$$G_x = \nabla_x(x_i + h, y_j + k) \quad \text{Equation 1}$$

$$G_y = \nabla_y(x_i + h, y_j + k) \quad \text{Equation 2}$$

$$G_{xx} = \sum_{h=-w}^{w}\sum_{k=-w}^{w} \nabla_x(x_i + h, y_j + k)^2 \quad \text{Equation 3}$$

$$G_{yy} = \sum_{h=-w}^{w}\sum_{k=-w}^{w} \nabla_y(x_i + h, y_j + k)^2 \quad \text{Equation 4}$$

$$G_{xy} = \sum_{h=-w}^{w}\sum_{k=-w}^{w} \nabla_x(x_i + h, y_j + k)\nabla_y(x_i + h, y_j + k) \quad \text{Equation 5}$$

$$\theta_{ij} = 90° + \frac{1}{2}\arctan\left[\frac{2G_{xy}}{G_{xx} - G_{yy}}\right] \quad \text{Equation 6}$$

wherein $(x_i, y_j)$ may denote the coordinates of an $(i, j)$-th pixel in the $(x, y)$ direction in the fingerprint region, a width and a length of each block may each be $2w$, $\theta_{ij}$ may denote a ridge direction in a block having a central pixel with coordinates $(x_i, y_j)$.

Figure 1B:
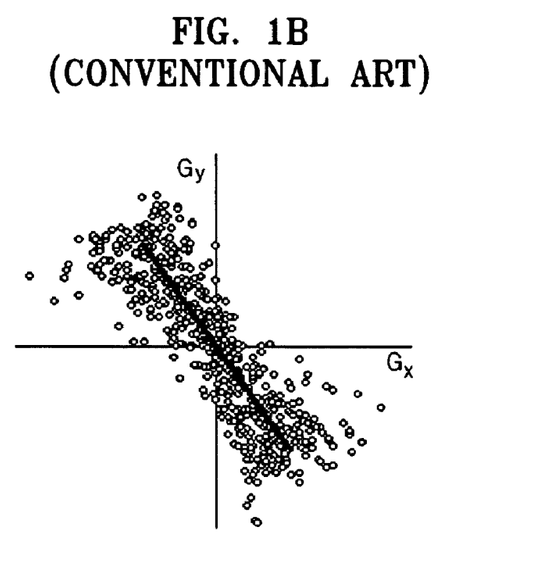
FIG. 1B illustrates pixels positioned within a gradient for the conventional block of FIG. 1A.

FIG. 1B illustrates pixels positioned within a gradient (Gx, Gy) for the conventional block of FIG. 1A. The straight line in FIG. 1B may indicate the ridge direction in the block. Referring to FIG. 1B, the ridge direction may be represented as a straight line diagonally crossing the gradient (Gx, Gy). The ridge direction illustrated in FIG. 1B may be based on the pixels calculated with Equations 1 through 6 as discussed above.

A maximum direction in a gradient field may be determined as the ridge direction in the block using a least square (LS) algorithm. However, determining the maximum direction in this manner may increase an affect of outliers. For example, a wound at the finger and/or noise in the fingerprint may affect the maximum direction, thereby reducing the relevance of the calculated maximum direction.

Figure 2:
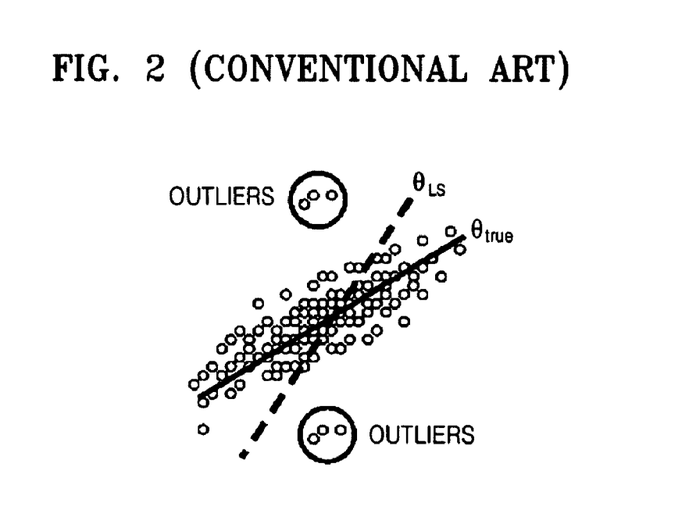
FIG. 2 illustrates a ridge direction attained via a conventional least square (LS) algorithm.

FIG. 2 illustrates a ridge direction attained via a conventional least square (LS) algorithm. As shown in FIG. 2, due to outliers present within the gradient, the ridge direction may be disproportionately skewed by the outliers such that an inaccurate ridge direction ($\theta_{true}$) may be obtained instead of an accurate ridge direction ($\theta_{LS}$).

Cameras may be mounted in portable terminal apparatuses (e.g., mobile phones, PDAs, etc.). The development of more accurate image sensors and image processing technologies capable of deployment within smaller-scale devices may facilitate higher quality image extraction from portable terminal apparatuses. Accordingly, biometric authentication, such as fingerprint recognition, may be implemented at such portable terminal apparatuses based on fingerprint images obtained through a camera mounted thereon. However, fingerprint images obtained through digital image capture at portable terminal apparatuses may be less accurate than fingerprint images obtained with conventional contact-type fingerprint acquisition apparatus, such as a fingerprint sensor. Accordingly, it may be difficult to extract a fingerprint image and the direction of a fingerprint ridge from a fingerprint image obtained through a camera mounted on a conventional portable terminal apparatus.

Figure 3A:
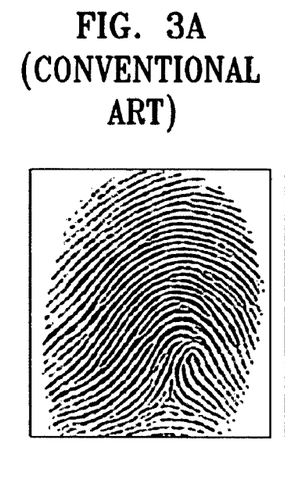
FIGS. 3A and 3B illustrate fingerprint images obtained with a conventional contact-type fingerprint sensor.
Figure 3B:
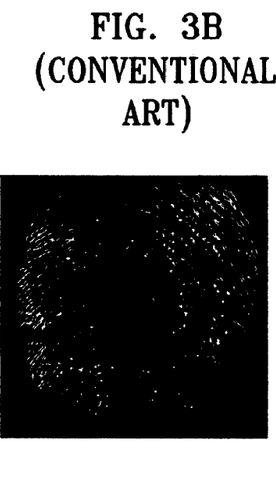
Figure 3C:
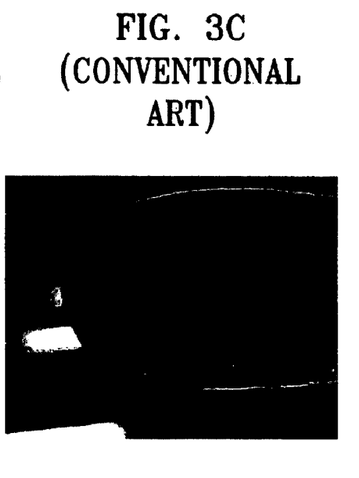
FIG. 3C illustrates a fingerprint image obtained with a camera mounted on a conventional portable terminal apparatus.

FIGS. 3A and 3B illustrate fingerprint images obtained with a conventional contact-type fingerprint sensor. FIG. 3C illustrates a fingerprint image obtained with a camera mounted on a conventional portable terminal apparatus.

As shown in FIGS. 3A and 3B, the conventional contact-type fingerprint sensor, a background part may appear uniformly. The background part of the fingerprint image may refer to a portion where a user's finger may not be in contact with the contact-type fingerprint sensor during the fingerprint image scan. Accordingly, values such as mean brightness and/or variance of the fingerprint image may allow the fingerprint region and the background region to be distinguished.

However, as shown in FIG. 3C, the background part of a fingerprint image obtained with the camera of a portable terminal apparatus may be cluttered with objects peripheral to the user's finger. Accordingly, it may become more difficult to distinguish between the background part and the fingerprint region in fingerprint images obtained with a camera of a portable terminal apparatus. Further, an illumination difference between the ridge and valley of a fingerprint image obtained with a camera of a portable terminal apparatus may be lower than that obtained with the conventional contact-type fingerprint sensor. For example, a wound of a finger may more negatively affect fingerprint recognition of fingerprint images obtained with a camera (e.g., mounted on a portable terminal apparatus) than a conventional contact-type fingerprint sensor.

SUMMARY OF THE INVENTION

An example embodiment of the present invention is directed to a method of capturing a fingerprint, including obtaining a first fingerprint image in a guard region within a captured image, the guard region including less than all of the captured image and extracting a fingerprint region based on a predicted color distribution, the predicted color distribution based on color information associated with the first fingerprint image, the extracted fingerprint region including the first fingerprint image within the guard region and at least a portion of the fingerprint region extending beyond the guard region within the captured image.

Another example embodiment of the present invention is directed to an apparatus for capturing a fingerprint, including a fingerprint image acquisition unit obtaining a first fingerprint image in a guard region within a captured image, the guard region including less than all of the captured image and a fingerprint region extraction unit extracting a fingerprint region based on a predicted color distribution, the predicted color distribution based on color information associated with the first fingerprint image, the extracted fingerprint region including the first fingerprint image within the guard region and at least a portion of the fingerprint region extending beyond the guard region within the captured image.

Another example embodiment of the present invention is directed to a method of capturing a fingerprint, including defining a guard region within a picture boundary area, the defined guard region including less than all of the picture boundary area, capturing at least one image, the captured image spanning the picture boundary area, extracting information associated with the captured image within the guard region and identifying portions of the captured image associated with a user's fingerprint based on the extracted information, the identified portions including a first portion within the guard region of the captured image and a second portion within the picture boundary area of the captured image outside of the guard region.

An example embodiment of the present invention is directed to a method of extracting fingerprint characteristics, such as a fingerprint region and a ridge direction, from a fingerprint image obtained through a camera of a portable terminal apparatus.

Another example embodiment of the present invention is directed to an apparatus for extracting fingerprint characteristics, such as a fingerprint region and a ridge direction, from a fingerprint image obtained through a camera of a portable terminal apparatus.

Another example embodiment of the present invention is directed to a fingerprint recognition system capable of recognizing a fingerprint by comparing a fingerprint image obtained through a camera of a portable terminal apparatus with a stored fingerprint image.

BRIEF DESCRIPTION OF THE DRAWINGS

The patent or application file contains at least one drawing executed in color. Copies of this patent or patent application publication with color drawing will be provided by the Office upon request and payment of the necessary fee.

The accompanying drawings are included to provide a further understanding of the invention, and are incorporated in and constitute a part of this specification. The drawings illustrate example embodiments of the present invention and, together with the description, serve to explain principles of the present invention.

DETAILED DESCRIPTION OF EXAMPLE EMBODIMENTS OF THE PRESENT INVENTION

Detailed illustrative example embodiments of the present invention are disclosed herein. However, specific structural and functional details disclosed herein are merely representative for purposes of describing example embodiments of the present invention. Example embodiments of the present invention may, however, be embodied in many alternate forms and should not be construed as limited to the embodiments set forth herein.

Accordingly, while example embodiments of the invention are susceptible to various modifications and alternative forms, specific embodiments thereof are shown by way of example in the drawings and will herein be described in detail. It should be understood, however, that there is no intent to limit example embodiments of the invention to the particular forms disclosed, but conversely, example embodiments of the invention are to cover all modifications, equivalents, and alternatives falling within the spirit and scope of the invention. Like numbers may refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. Conversely, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will now be described with respect to example embodiments of the present invention, in order to extract a fingerprint image with a camera (e.g., of a portable terminal apparatus), a guard region may be set such that an input finger region may restrict a fingerprint region to the guard region. Also, a fingerprint region may be extracted based at least in part on a color associated with the input finger region.

Figure 4:
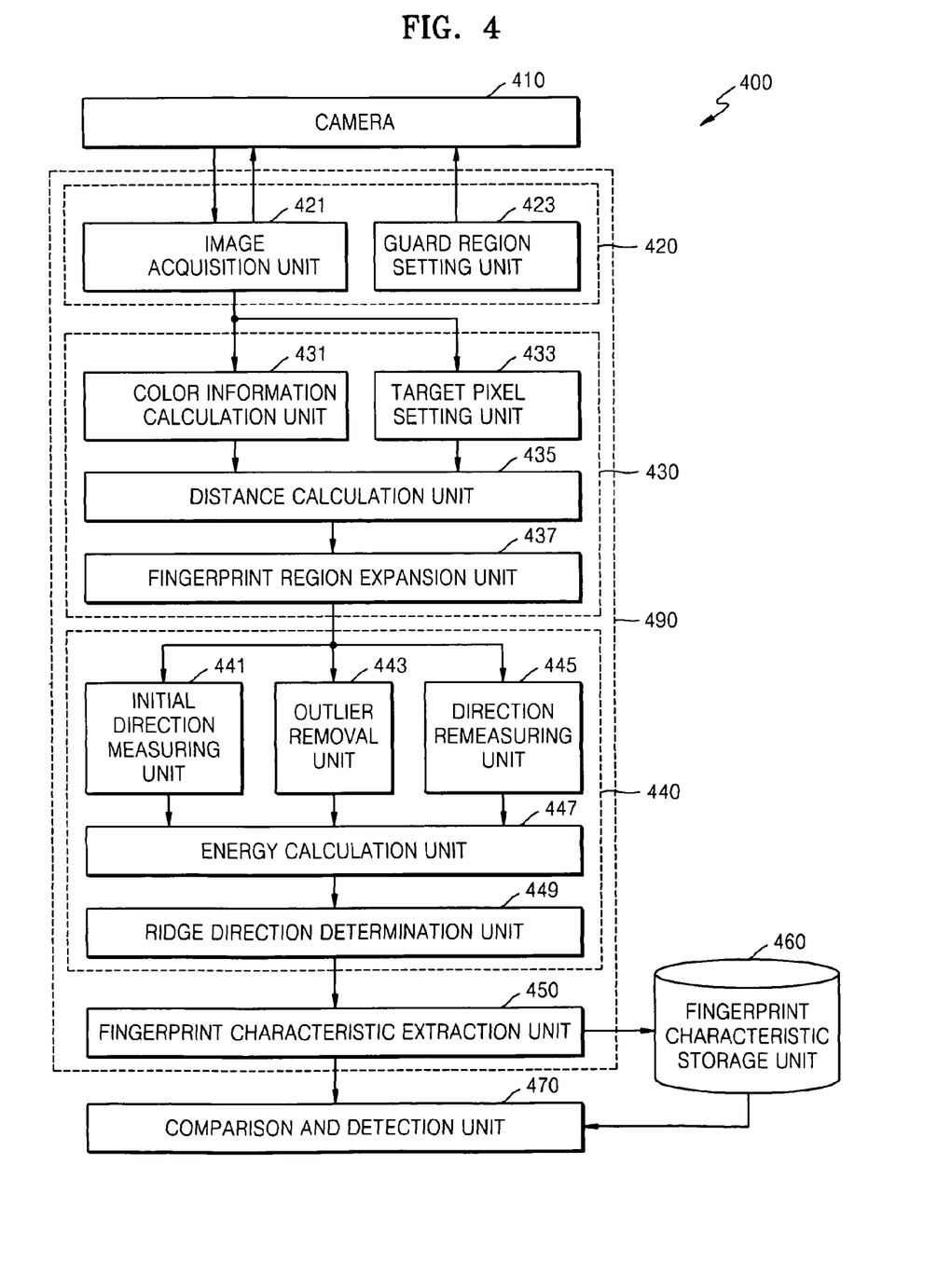
FIG. 4 illustrates a block diagram of a fingerprint recognition system according to an example embodiment of the present invention.

FIG. 4 illustrates a block diagram of a fingerprint recognition system 400 according to an example embodiment of the present invention.

In the example embodiment of FIG. 4, the fingerprint recognition system 400 may include a camera 410 (e.g., within a portable terminal apparatus). The fingerprint recognition system 400 may further include a fingerprint characteristic extraction apparatus 490, a fingerprint characteristic storage unit 460, and a comparison and detection unit 470. The fingerprint characteristic extraction apparatus 490 may extract fingerprint characteristics from a fingerprint image captured by the camera 410. The fingerprint characteristic storage unit 460 may store the extracted fingerprint characteristics. The comparison and detection unit 470 may perform fingerprint recognition by comparing the extracted fingerprint characteristics with stored fingerprint characteristics.

In the example embodiment of FIG. 4, the fingerprint characteristic extraction apparatus 490 may include a fingerprint image acquisition 420, a fingerprint region extraction unit 430, a ridge direction extraction unit 440, and a fingerprint characteristic extraction unit 450. The fingerprint image acquisition unit 420 may obtain a first fingerprint image in a guard region set in an image captured by the camera 410. The fingerprint region extraction unit 430 may extract a fingerprint region by predicting a color distribution based on the color information of the obtained first fingerprint image. The ridge direction extraction unit 440 may divide the extracted fingerprint region into a plurality of blocks and may reduce a number of outliers from plurality of the blocks based on a gradient and an initial direction obtained for each of the plurality of blocks. Thereby, the ridge direction extraction unit 440 may extract the ridge direction for each of the plurality of blocks. The fingerprint characteristic extraction unit 450 may obtain a second fingerprint image based on the extracted fingerprint region and ridge direction. The ridge direction extraction unit 440 may extract the fingerprint characteristics by binarizing and/or thinning the second fingerprint image.

Figure 5:
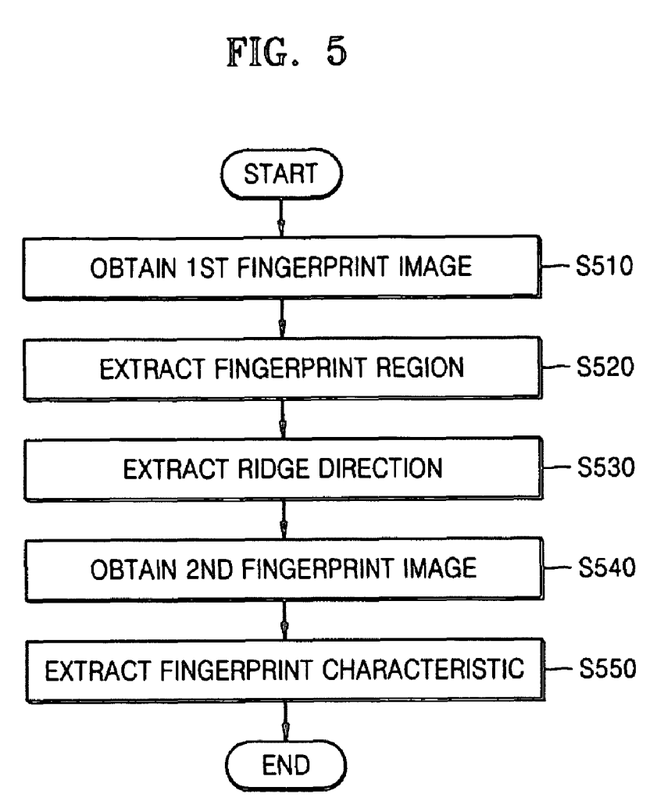
FIG. 5 is a flowchart illustrating a process of extracting fingerprint characteristics according to another example embodiment of the present invention.

FIG. 5 is a flowchart illustrating a process of extracting fingerprint characteristics according to another example embodiment of the present invention.

In the example embodiment of FIG. 5, a first fingerprint image may be obtained (at S510) and a fingerprint region in the first fingerprint image may be extracted (at S520). A ridge direction may be determined based on the extracted fingerprint region (at S530). A second fingerprint image (e.g., an "improved" fingerprint image as compared to the first fingerprint image) may be extracted (at S540). In an example, the second fingerprint image may be based on the extracted fingerprint region and/or ridge direction of the first fingerprint image. Fingerprint characteristics of the second fingerprint image may then be extracted (at S550). In an example, the process of FIG. 5 may be performed with the fingerprint recognition system 400 of FIG. 4.

The example fingerprint recognition system 400 of FIG. 4 and the example process of FIG. 5 will now be described in further detail with respect to FIGS. 6 through 9.

As discussed above, the fingerprint image acquisition unit 420 may obtain a first fingerprint image in a guard region set within an image captured by the camera 410. In an example, the guard region may be set within the image captured by the camera 410 such that the user may be prompted or otherwise directed to attempt to position his or her finger within the guard region. Accordingly, users are trained to position their finger in order over the guard region to more accurately capture fingerprint images.

Figure 6A:
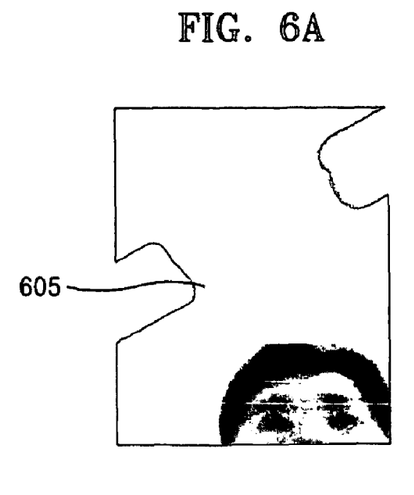
FIGS. 6A and 6B illustrate a guard region positioned within a captured image according to another example embodiment of the present invention.
Figure 6B:
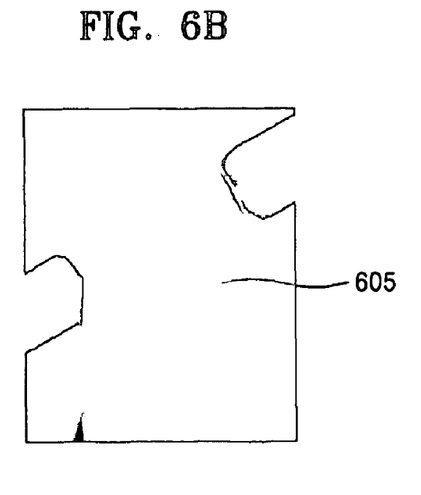

FIGS. 6A and 6B illustrate a guard region 605 positioned within a captured image according to another example embodiment of the present invention. In an example, the guard region 605 may have a rectangular shape positioned at the center of the captured image. However, the shape illustrated for the guard region 605 is intended for example purposes only, and it is understood that other shapes may be employed in alternative example embodiments of the present invention (e.g., an oval shape, a circular shape, another polygon such as an octagon, etc.). Also, while the guard region 605 is illustrated in FIGS. 6A and 6B as being centered within the captured video images, the guard region 605 may be positioned anywhere within the captured video image in other example embodiments of the present invention.

In the example embodiments of FIG. 6B, the user may place his/her finger on (e.g., overlapping with) the guard region 605 during image capture to facilitate a valid fingerprint scan. Accordingly, within the guard region 605 of FIG. 6B, portions of the user's finger may be captured. For example, if a user positions his/her finger directly over the guard region 605, the guard region 605 in the captured image may include fingerprint information, and not background information. Thus, the background part (e.g., objects peripheral to the user's finger which may not be associated with the user's finger) may be, at least initially, ignored in favor of information provided within the guard region 605. Thus, a user is trained or prompted to perform fingerprint scans by positioning the user's finger within the guard region 605, more accurate fingerprint scanning may be achieved.

As discussed above, the fingerprint image acquisition unit 420 may obtain a first fingerprint image in the guard region (e.g., guard region 605 of FIGS. 6A and 6B) set within a picture boundary area within which images may be captured by the camera 410 (at S510 of FIG. 5). Example operation of S510 of FIG. 5 will now be described in greater detail with reference to the example embodiment FIG. 7.

Figure 7:
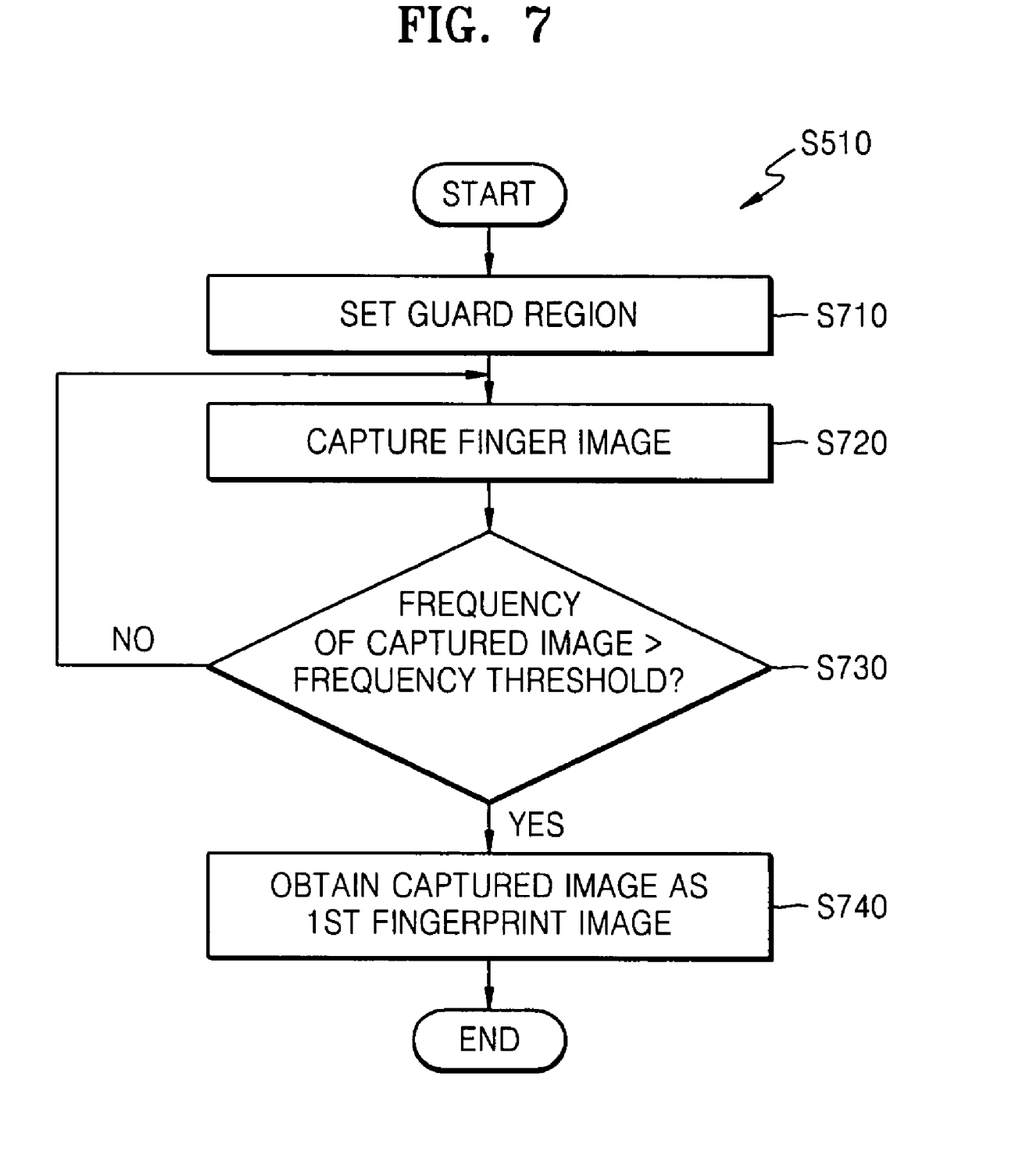
FIG. 7 is a flowchart illustrating a process of obtaining a fingerprint image according to another example embodiment of the present invention.

FIG. 7 is a flowchart illustrating a process of obtaining a first fingerprint image in accordance with the example process of FIG. 5. In particular, FIG. 7 expands upon S510 of the example embodiment of FIG. 5 and shows how the first fingerprint image may be obtained.

In the example embodiment of FIG. 7, the guard region setting unit 423 may define a guard region (e.g., guard region 605 of FIGS. 6A and 6B) with which to train a user for finger placements during image capture for fingerprint scanning (at S701). If the user places his/her finger within the guard region, the finger image may be captured by the camera (at S720). The image acquisition unit 421 may receive the captured image and may determine whether the captured image includes an image of a finger within the guard region (e.g., whether the guard region includes a finger region or a background region).

In the example embodiment of FIG. 7, the image acquisition unit 421 may measure a frequency of the captured image within the guard region. The measured frequency may be compared with a frequency threshold (at S730). The image acquisition unit 421 may use the comparison (at S730) to determine whether the captured image is a finger region or a background region. Accordingly, if the comparison indicates that the measured frequency is greater than the frequency threshold, the image acquisition unit 421 may determine that the captured image is a finger region and the process of FIG. 7 may advance to S740. Alternatively, if the comparison indicates that the measured frequency is not greater than the frequency threshold, the image acquisition unit 421 may determine that the captured image is a background region, and the process may thereby return to S720 and waits for the user to attempt to capture another fingerprint.

In the example embodiment of FIG. 7, the image acquisition unit 421 may measure the frequency (at S730) based on a discrete wavelet transform and/or a Tenengrad method. Also, in an example, the frequency threshold may be a value based on a type of the camera 410, characteristics associated with the captured image background (e.g., a degree of illumination or brightness, color, etc.).

In the example embodiment of FIG. 7, if the comparison of S730 determines that the captured image within the guard region is a finger region, the image acquisition unit 421 may treat the captured image in the guard region as the first fingerprint image (at S740).

As discussed above with respect to the example embodiment of FIG. 5, after the first fingerprint image is obtained, the fingerprint region extraction unit 430 may extract a fingerprint region by predicting a color distribution based on color information provided within the first fingerprint image (at S520). Example operation of S520 of FIG. 5 will now be described in greater detail with reference to the example embodiment FIG. 8. In an example, S520 of FIG. 5 and the example process of FIG. 5 may be performed by the fingerprint region extraction unit 430 of FIG. 4.

Figure 8:
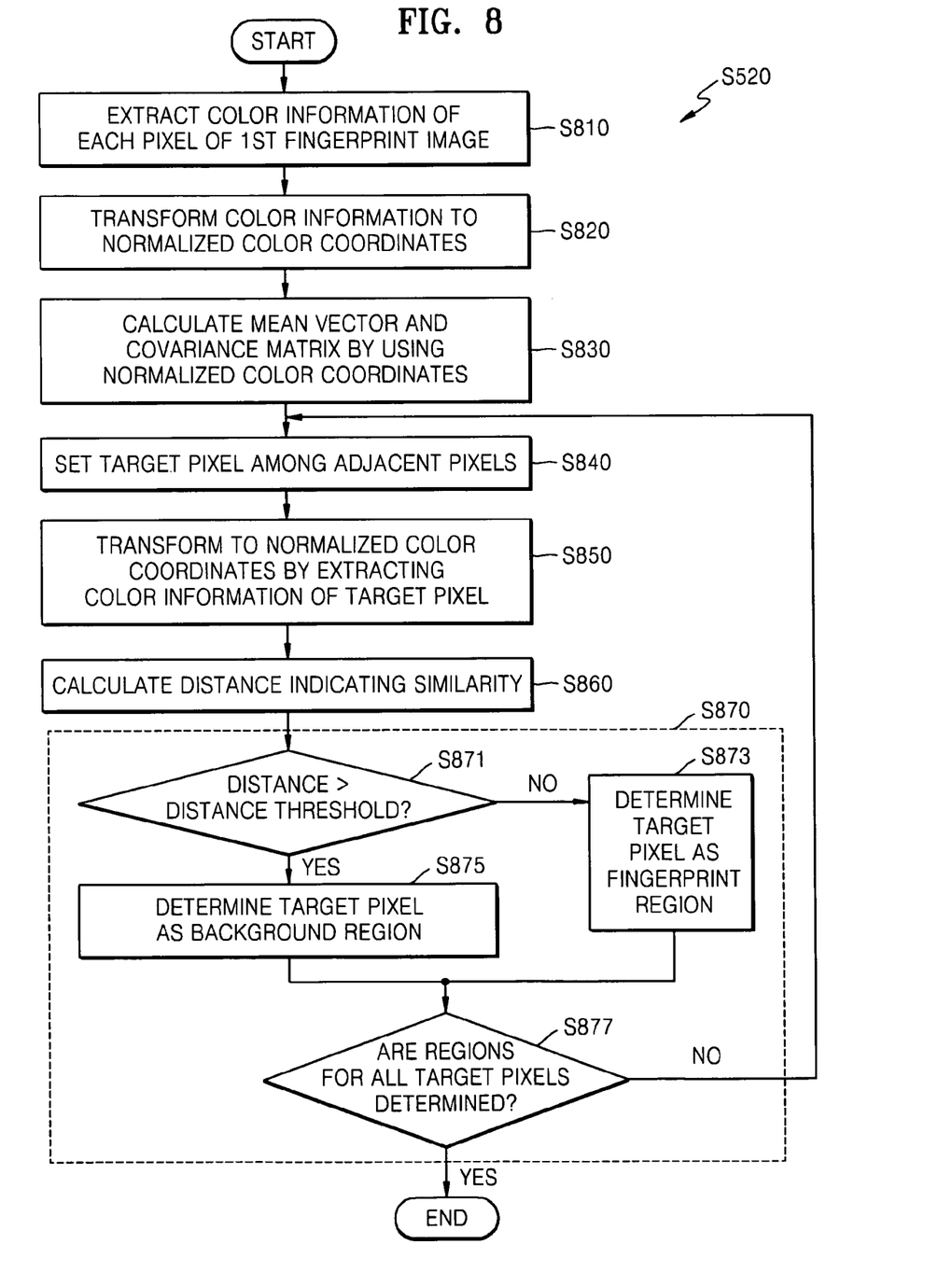
FIG. 8 is a flowchart illustrating a process of extracting a fingerprint region according to another example embodiment of the present invention.

FIG. 8 is a flowchart illustrating a process of extracting a fingerprint region according to another example embodiment of the present invention. In particular, FIG. 7 expands upon S520 of the example embodiment of FIG. 5 and shows how the a fingerprint region may be extracted from the first fingerprint image (from S510).

In the example embodiment of FIG. 8, the color of a finger may vary based on a skin tone of the user (e.g., a darker skin tone, a lighter skin tone, etc.) and/or the surrounding environment of the user (e.g., whether the surrounding area is well-lighted, etc.). However, for a particular user, the colors associated with a finger region may be relatively similar to each other. Thus, a fingerprint region may be extracted by determining a color distribution associated with an entire input finger, which may be predicted based on the color information within the guard region (e.g., because the guard region may be representative of a portion of the finger region). An acceptable range of the fingerprint region may be expanded such that the fingerprint region may be extracted based on the predicted color distribution. In other words, the guard region may provide information suitable to predict a color tone of a user's finger for a particular image. The color tone may then be used to extract an entirety of the fingerprint region (e.g., including positions outside of the guard region) by extracting color portions similar to the predicted color tone.

In the example embodiment of FIG. 8, the color information calculation unit 431 may extract color information ($R_{ij}$, $G_{ij}$, $B_{ij}$) of each pixel of the first fingerprint image i (at S810) and may transform the color information ($R_{ij}$, $G_{ij}$, $B_{ij}$) into normalized color coordinates ($r_{ij}$, $g_{ij}$, $b_{ij}$) (at S820). As used herein, ($R_{ij}$, $G_{ij}$, $B_{ij}$) may denote color information in the (i, j)-th pixel in the (x, y) direction. In an example, the color information may include red ($R_{ij}$), green ($G_{ij}$), and blue ($B_{ij}$) elements. However, it is understood that other example embodiments may include other elements either in addition to or in place of the red ($R_{ij}$), green ($G_{ij}$), and blue ($B_{ij}$) elements. For example, the color information in other example embodiments of the present invention may include one or more of magenta ($M_{ij}$), cyan ($C_{ij}$), and yellow ($Y_{ij}$). In another example, the normalized color coordinates ($r_{ij}$, $g_{ij}$, $b_{ij}$) may be obtained by the following Equations 7-9:

$$r_{ij} = \frac{R_{ij}}{(R_{ij} + G_{ij} + B_{ij})} \quad \text{Equation 7}$$

$$g_{ij} = \frac{G_{ij}}{(R_{ij} + G_{ij} + B_{ij})} \quad \text{Equation 8}$$

$$b_{ij} = \frac{B_{ij}}{(R_{ij} + G_{ij} + B_{ij})} \quad \text{Equation 9}$$

In the example embodiment of FIG. 8, the color information calculation unit 431 may calculate a mean vector (m) and a covariance matrix (Σ) of the first fingerprint image based on the normalized color coordinates ($r_{ij}$, $g_{ij}$, $b_{ij}$) (at S830). In an example, the mean vector (m) and covariance matrix (Σ) may be calculated based on any two elements present within the normalized color coordinates (e.g., $r_{ij}$ and $g_{ij}$, $g_{ij}$ and $b_{ij}$, $r_{ij}$ and $b_{ij}$, etc.). In an example, the mean vector (m) and covariance matrix (Σ) may be calculated by based on normalized color coordinate elements ($r_{ij}$, $b_{ij}$) in accordance with Equations 10-13 as follows:

$$m = (\bar{r}, \bar{b}) \quad \text{Equation 10}$$

$$\bar{r} = \frac{1}{N}\sum_{i=1}^{N} r_i \quad \text{Equation 11}$$

$$\bar{b} = \frac{1}{N}\sum_{i=1}^{N} b_i \quad \text{Equation 12}$$

$$\sum = \begin{bmatrix} \sigma_{rr} & \sigma_{rb} \\ \sigma_{br} & \sigma_{bb} \end{bmatrix} \quad \text{Equation 13}$$

wherein N may denote a number of pixels present within the guard region of the first fingerprint image, and $\sigma_{rr}$, $\sigma_{rb}$, $\sigma_{br}$, and $\sigma_{bb}$ may denote covariances of $r_{ij}$ and $r_{ij}$, $r_{ij}$ and $b_{ij}$, $b_{ij}$ and $r_{ij}$, and $b_{ij}$ and $b_{ij}$, respectively. It will be readily apparent to one of ordinary skill in the art as to how to obtain the covariances ($\sigma_{rr}$, $\sigma_{rb}$, $\sigma_{br}$, and $\sigma_{bb}$) based on the mean vector (m) and the normalized color coordinate elements ($r_{ij}$, $b_{ij}$), and as such, a description thereof has been omitted for the sake of brevity.

In the example embodiment of FIG. 8, the target pixel setting unit 433 may set "target pixels" based on, but not including, the N pixels within the guard region of the first fingerprint image. The target pixels may include pixels which are not yet classified as being associated with either a fingerprint region or a background region among pixels adjacent to the region in which the first fingerprint image is obtained (e.g., the guard region) (at S840). The target pixel setting unit 433 may extract the color information from the target pixels, and may transform the extracted color information into normalized color coordinates (x(i)) (e.g., by using Equations 7-9) (at S850).

In the example embodiment of FIG. 8, the distance calculation unit 435 may calculate a distance (D(i)), which may indicate a level of similarity between the first fingerprint image and the target pixels, based on the normalized color coordinates (x(i)) of the target pixels, the mean vector (m) and covariance matrix (Σ) (at S860). In an example, the distance (D(i)) may be a Mahalanobis distance, which may be obtained with Equation 14 as follows:

$$D(i)=(x(i)-m)^T \Sigma^{-1}(x(i)-m) \quad \text{Equation 14}$$

In the example embodiment of FIG. 8, the fingerprint region expansion unit 437 may compare the distance (D(i)) with a distance threshold and may expand the fingerprint region (at S870). In an example, the distance threshold may be a value determined based on a type of the camera 410, a background of the captured image, a degree of illumination of one or more pixels in the captured image, and/or any other known user-specific, image-specific or camera-specific parameter. Example operation of the fingerprint region expansion unit 437 will now be explained in more detail.

In the example embodiment of FIG. 8, the fingerprint region expansion unit 437 may compare the distance (D(i)) with the distance threshold (at S871). If the distance (D(i)) is less than the distance threshold, the fingerprint region expansion unit 437 may determine that the target pixel is associated with a fingerprint region and the fingerprint region may be expanded (e.g., to include the target pixel) (at S873). In an alternative example, if the distance (D(i)) is not less than (e.g., greater than) the distance threshold, the fingerprint region expansion unit 437 may determine that the target pixel is associated with a background region (at S875).

In the example embodiment of FIG. 8, the fingerprint region expansion unit 437 may determine whether all of the target pixels have been classified as being associated with one of the fingerprint region and the background region (at S877). If the target pixels have not all been successfully classified, the fingerprint region expansion unit 437 returns to S840 and repeats S840 through S877 until all target pixels may be successfully classified.

Accordingly, as described above with respect to the example embodiment of FIG. 8, a fingerprint may be expanded from an initial set of pixels restricted to the guard region to additional "target pixels" positioned outside of the guard region, with the target pixels being selected based on a color similarity with pixels of the guard region. Accordingly, the guard region may facilitate a relatively accurate prediction of color for a user's fingerprint within a captured image, and the color prediction is then used to as to determine which pixels within the captured image are associated with the fingerprint.

Returning to the example embodiment of FIG. 5, as discussed above, the ridge direction extraction unit 440 may divide the extracted fingerprint region into a plurality of blocks. The ridge direction extraction unit 440 may reduce a number of outliers based on the gradient and initial direction obtained for each of the plurality of blocks. Thus, the ridge direction extraction unit 440 may extract the ridge direction for each of the plurality of blocks (at S530). A more detailed example of extracting the ridge direction at the ridge direction extraction unit 440 will now described in greater detail with reference to FIG. 9.

Figure 9:
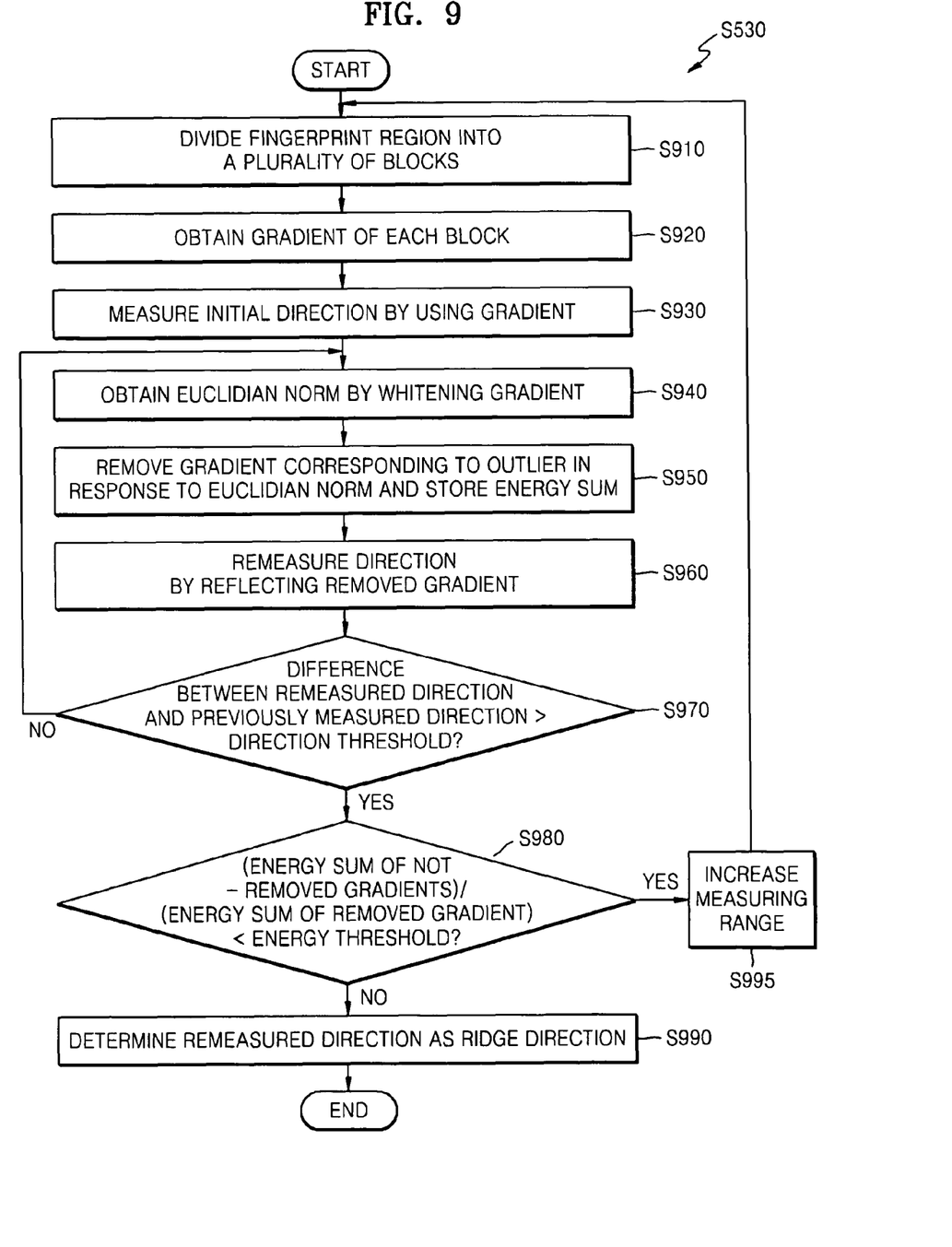
FIG. 9 is a flowchart illustrating a process of extracting a ridge direction according to another example embodiment of the present invention.

FIG. 9 is a flowchart illustrating a process of extracting a ridge direction according to another example embodiment of the present invention. In particular, FIG. 9 expands upon S530 of the example embodiment of FIG. 5 and shows how a ridge direction may be extracted. As will now be described, the process of FIG. 9 may be performed repeatedly, if necessary, in order to reduce a number of outliers based on the initial ridge direction obtained for each of the plurality of blocks.

In the example embodiment of FIG. 9, the initial direction measuring unit 441 may divide the extracted fingerprint region into a plurality of blocks (at S910), may obtain the gradient of each of the plurality of blocks (at S920), and may measure the initial direction of each of the plurality of blocks based on the gradient (at S930). In an example, the gradient of each of the plurality of blocks may be obtained (at S920) by the well-known Sobel calculation and the initial direction of each of the plurality of blocks be obtained by the least square (LS) algorithm.

In the example embodiment of FIG. 9, the outlier removal unit 443 may whiten the gradient and may obtain a Euclidian norm of the gradient (at S940). Then, the outlier removal unit 443 may remove portions of the gradient corresponding to outliers based on the Euclidian norm (at S950). It will be readily apparent to one of ordinary skill in the art as to how to whiten the given gradient and how to obtain the Euclidian norm of the gradient based on the whitened gradient. Accordingly, a more detailed description thereof has been omitted for the sake of brevity. As an example, if the Euclidian norm is greater than a given amount (e.g., 2), the outlier removal unit 443 may determine that the gradient corresponds to outliers.

In the example embodiment of FIG. 9, if the outlier removal unit 443 determines that one or more outliers exist, the outlier removal unit 443 may remove the gradient corresponding to the outliers and may store a sum of energy of the removed gradient and a sum of the non-removed gradient portion (at S950).

In the example embodiment of FIG. 9, the direction remeasuring unit 445 may remeasure the direction of each of the plurality of blocks after the outlier reduction (at S960). In an example, the direction remeasuring unit 445 may also remeasure the direction by reapplying the least square (LS) algorithm.

In the example embodiment of FIG. 9, the energy calculation unit 447 may calculate a difference between the remeasured direction (from S960) and the previously measured direction (from S930) and may compare the difference with a direction threshold (at S970). In an example, the direction threshold may be based on a type of the camera 410, a background of the captured image, a degree of illumination of pixels within the captured image, etc. If the comparison indicates that the difference of the direction is greater than the direction threshold, the energy calculation unit 447 may return to S940 and repeat S940 through S970. Alternatively, if the difference of the direction is not greater than the direction threshold, the energy calculation unit 447 may calculate the ratio of the energy sum of not-removed gradient to the energy sum of the removed gradients.

In the example embodiment of FIG. 9, the ridge direction determination unit 449 may compare the ratio of the energy sums with an energy threshold (at S980). If the comparison indicates that the ratio of the energy sums is less than the energy threshold, the ridge direction determination unit 449 may increase a measuring range (at S995) such that for a next iteration of S910 through S970. Alternatively, if the ratio of the energy sums is not less than the energy threshold, the ridge direction determination unit 449 may interpret the remeasured direction as the ridge direction (at S990). In an example, the energy threshold may be based on a type of the camera 410, a background of the captured image, a degree of illumination of pixels within the captured image, etc.

In another example embodiment of the present invention, repeatedly reducing a number of outliers (e.g., as in the process of FIG. 9) may allow the ridge direction to be determined within each of a plurality of blocks even if noise is at higher levels and/or a wound is present within a scanned finger. In other words, slight imperfections of a scanned fingerprint may be at least partially negated by the above-described processes. The fingerprint characteristic extraction unit 450 may obtain a second fingerprint image based on the extracted fingerprint region and the ridge direction (at S540) and by binarizing and thinning the second fingerprint image. The fingerprint characteristic extraction unit 450 may then extract the fingerprint characteristics (at S550). The outlier removal may increase a likelihood of obtaining a valid fingerprint, such as from a portable terminal apparatus.

Example embodiments of the present invention being thus described, it will be obvious that the same may be varied in many ways. For example, while example embodiments of the present invention have been described as directed to evaluating fingerprint images captured by a camera mounted on a portable device, such as a mobile phone, it is understood that other example embodiments of the present invention may be directed to any type of image capture device, and is not intended to be limited to portable consumer products.

Such variations are not to be regarded as a departure from the spirit and scope of example embodiments of the present invention, and all such modifications as would be obvious to one skilled in the art are intended to be included within the scope of the following claims.

What is claimed is:

1. A method of capturing a fingerprint, comprising:
   obtaining a first fingerprint image in a guard region preset within a captured image, the guard region including less than all of the captured image; and
   extracting a fingerprint region based on a predicted color distribution, the predicted color information based on color information associated with the first fingerprint image, the extracted fingerprint region including the first fingerprint image within the guard region and at least a portion of the fingerprint region extending beyond the guard region within the captured image, wherein
   the extracting of the fingerprint region includes expanding the fingerprint region based on the predicted color distribution, and wherein extracting of the fingerprint region includes:
      extracting color information for each pixel of the first fingerprint image;
      transforming the color information into normalized color coordinates;
      calculating a mean vector and a covariance matrix of the first fingerprint image based on the normalized color coordinates;
      setting as target pixels, pixels which are not yet determined to be associated with one of a fingerprint region or a background region, within the captured image outside of the guard region;
      extracting target color information of the target pixels and transforming the target color information into target normalized color coordinates;
      calculating a distance indicating a similarity between the first fingerprint image and the target pixels based the target normalized color coordinates of the target pixels, the mean vector and the covariance matrix:
      comparing the calculated distance with a distance threshold; and
      expanding a temporary fingerprint region according based on a result of the comparison.

2. The method of claim 1, further comprising:
   dividing the fingerprint region into a plurality of blocks;
   reducing a number of outliers present within at least one of the plurality of blocks; and
   extracting a ridge direction for each of the plurality of blocks.

3. The method of claim 2, further comprising:
   obtaining a second fingerprint image based on the fingerprint region and the ridge direction; and
   determining fingerprint characteristics by binarizing and thinning the second fingerprint image.

4. The method of claim 2, wherein reducing the number of outliers is performed based on a gradient and an initial direction of the at least one of the plurality of blocks.

5. The method of claim 3, wherein measuring the frequency is based on a at least one of discrete wavelet transform or a Tenengrad method.

6. The method of claim 2, wherein extracting the ridge direction includes:
   dividing the fingerprint region into a plurality of blocks and obtaining the gradient for each of the plurality of blocks;
   measuring an initial direction of each of the plurality of blocks based on the gradient;

obtaining a Euclidian norm of the gradient, for each of the plurality of blocks, by whitening the gradient and in response to the Euclidian norm;

removing one or more gradients for one or more of the plurality of blocks, the removed gradients corresponding to outliers;

remeasuring a direction of each of the plurality of blocks after the removing of the outlier gradients;

calculating a ratio of an energy sum of non-removed gradients to an energy sum of the removed gradients if a difference between the remeasured direction and a previously measured direction is greater than a threshold;

repeating the obtaining, removing, remeasuring and calculating steps if the difference between the remeasured direction and a previously measured direction is not greater than the threshold;

increasing the measuring range and then repeating the dividing, measuring, obtaining, removing, remeasuring and calculating if the ratio of the energy sums is less than an energy threshold; and interpreting the remeasured direction as the ridge direction if the ratio is not less than the energy threshold.

7. The method of claim 6, wherein obtaining the Euclidian norm and removing the gradient further includes:

storing the energy sum of the removed gradients and the energy sum of the non-removed gradients.

8. The method of claim 1, wherein obtaining the first fingerprint image includes:

setting the guard region;

capturing an image of a finger at least within the guard region to attain the captured image;

determining whether the captured image, within the guard region, corresponds to a finger region or a background region; and interpreting the captured image, within the guard region, as the first fingerprint image if the captured image, within the guard region, is determined to correspond to the finger region.

9. The method of claim 8, wherein the determining of whether the captured image within the guard region corresponds to a finger region or a background region includes:

measuring a frequency of the captured image within the guard region;

comparing the measured frequency with a frequency threshold;

determining the captured image, within the guard region, to correspond to a finger region if the measured frequency is greater than the frequency threshold; and determining the captured image, within the guard region, to correspond to a background region if the measured frequency is not greater than the frequency threshold.

10. The method of claim 9, further comprising:

repeating at least the obtaining and extracting steps if the captured image, within the guard region, is determined to correspond with the background region.

11. The method of claim 1, wherein at least one of the normalized color coordinates $(r_y, g_y, b_y)$ and target normalized color coordinates $(r_y, g_y, b_y)$ are obtained by the following equations:

$$r_{ij} = \frac{R_{ij}}{(R_{ij} + G_{ij} + B_{ij})},$$

$$g_{ij} = \frac{G_{ij}}{(R_{ij} + G_{ij} + B_{ij})},$$

$$b_{ij} = \frac{B_{ij}}{(R_{ij} + G_{ij} + B_{ij})}$$

wherein $R_y, G_y, B_y)$ is corresponds to color information of the (i, j)-th pixel of either the first fingerprint image or the target pixels.

12. The method of claim 1, wherein the mean vector and covariance matrix are obtained based on at least two elements associated with the normalized color coordinates.

13. The method of claim 11, wherein the mean vector (m) and covariance matrix ($\Sigma$) are calculated based on the following equations:

$$m = (\bar{r}, \bar{b}),$$

$$\bar{r} = \frac{1}{N} \sum_{i=1}^{N} r_i,$$

$$\bar{b} = \frac{1}{N} \sum_{i=1}^{N} b_i,$$

$$\sum = \begin{bmatrix} \sigma_{rr} & \sigma_{rb} \\ \sigma_{br} & \sigma_{bb} \end{bmatrix}.$$

wherein N denotes a number of pixels in the fingerprint region, and $\sigma_{rr}, \sigma_{rb}, \sigma_{br},$ and $\sigma_{bb},$ denote covariances of $r_y$ and $r_y, r_y$ and $b_y, b_y$ and $r_y,$ and $b_y$ and $b_y,$ respectively.

14. The method of claim 1, wherein the temporary fingerprint region becomes the extracted fingerprint region when no additional expansions are possible.

15. The method of claim 1, wherein expanding the temporary fingerprint region includes determining that the target pixel corresponds to a fingerprint region if the distance is less than the distance threshold,; and determining the target pixel corresponds to a background region if the distance is greater than the distance threshold.

16. The method of claim 1, wherein the distance (D(i)) is a Mahalanobis distance expressed as follows:

$$D(i) = (x(i) - m)^T \Sigma^{-1} (x(i) - m)$$

wherein x(i) denotes the normalized color coordinates of the target pixel, m is the calculated mean vector, and $\Sigma^{-1}$ is the calculated covariance.

17. An apparatus performing the method of claim 1.

18. An apparatus for capturing a fingerprint, comprising:

a fingerprint image acquisition unit obtaining a first fingerprint image in a guard region preset within a captured image, the guard region including less than all of the captured image; and a fingerprint region extraction unit extracting a fingerprint region based on a predicted color distribution, the predicted color information based on color information associated with the first fingerprint image, the extracted fingerprint region including the first fingerprint image within the guard region and at least a portion of the fingerprint region extending beyond the guard region within the captured image, wherein the extraction of the fingerprint region by the fingerprint region extraction unit includes expanding the fingerprint region based on the predicted color distribution, and wherein the fingerprint region extraction unit includes a color information calculation unit extracting color information for each pixel of the first fingerprint image, transforming the color information into normalized color coordinates and calculating a mean vector and a covariance matrix of the first fingerprint image based on the normalized color coordinates;

a target pixel storage unit setting as target pixels, pixels which are not yet determined to be associated with one of a fingerprint region or a background region, within the captured image outside of the guard region and extracting target color information of the target pixels and transforming the target color information into target normalized color coordinates:

a distance calculation unit calculating a distance indicating a similarity between the first fingerprint image and the target pixels based the target normalized color coordinates of the target pixels, the mean vector and the covariance matrix;

a fingerprint region expansion unit comparing the calculated distance with a distance threshold and expanding a temporary fingerprint region according based on a result of the comparison.

19. The apparatus of claim 18, further comprising:

a ridge direction extraction unit dividing the fingerprint region into a plurality of blocks, reducing a number of outliers present within at least one of the plurality of blocks and extracting a ridge direction for each of the plurality of blocks;

a fingerprint characteristic extraction unit obtaining a second fingerprint image based on the fingerprint region and the ridge direction and determining fingerprint characteristics by binarizing and thinning the second fingerprint image.

20. The apparatus of claim 18, wherein the fingerprint image acquisition unit includes:

a guard region setting unit setting the guard region; and an image acquisition unit capturing an image of a finger at least within the guard region to attain the captured image, determining whether the captured image, within the guard region, corresponds to a finger region or a background region and interpreting the captured image, within the guard region, as the first fingerprint image if the captured image, within the guard region, is determined to correspond to the finger region.

21. The apparatus of claim 20, wherein the image acquisition unit measures a frequency of the captured image within the guard region, compares the measured frequency with a frequency threshold, determines the captured image, within the guard region, to correspond to a finger region if the measured frequency is greater than the frequency threshold and determines the captured image, within the guard region, to correspond to a background region if the measured frequency is not greater than the frequency threshold.

22. The apparatus of claim 21, wherein the frequency is measured based on at least one of a discrete wavelet transform and a Tenengrad method.

23. The apparatus of claim 18, wherein at least one of the normalized color coordinates $(r_y, g_y, b_y)$ and target normalized color coordinates $(r_y, g_y, b_y)$ are obtained by the following equation:

$$r_{ij} = \frac{R_{ij}}{(R_{ij} + G_{ij} + B_{ij})},$$

$$g_{ij} = \frac{G_{ij}}{(R_{ij} + G_{ij} + B_{ij})},$$

$$b_{ij} = \frac{B_{ij}}{(R_{ij} + G_{ij} + B_{ij})}$$

wherein $R_y, G_y, B_y$) is corresponds to color information of the (i, j)-th pixel of either the first fingerprint image or the target pixels.

24. The apparatus of claim 18, wherein the mean vector and covariance matrix are obtained based on at least two elements associated with the normalized color coordinates.

25. The apparatus of claim 18, wherein the mean vector (m) and covariance matrix ($\Sigma$) are calculated based on the following equation:

$$m = (\bar{r}, \bar{b}),$$

$$\bar{r} = \frac{1}{N}\sum_{i=1}^{N} r_i,$$

$$\bar{b} = \frac{1}{N}\sum_{i=1}^{N} b_i,$$

$$\sum = \begin{bmatrix} \sigma_{rr} & \sigma_{rb} \\ \sigma_{br} & \sigma_{bb} \end{bmatrix}.$$

wherein N denotes a number of pixels in the fingerprint region, and $\sigma_{rr}, \sigma_{rb}, \sigma_{br},$ and $\sigma_{bb}$) denote covariances of $r_y$ and $r_y$, $r_y$ and $b_y$, $b_y$ and $r_y$, and $b_y$ and $b_y$, respectively.

26. The apparatus of claim 18, wherein the temporary fingerprint region becomes the extracted fingerprint region when no additional expansions are possible.

27. The apparatus of claim 18, wherein the fingerprint region expansion unit determines that the target pixel corresponds to a fingerprint region if the distance is less than the distance threshold and determines the target pixel corresponds to a background region if the distance is greater than the distance threshold.

28. The apparatus of claim 18, wherein the distance (D(i)) is a Mahalanobis distance expressed as follows:

$$D(i)=(x(i)-m)^T\Sigma^{-1}(x(i)-m)$$

wherein x(i) denotes the normalized color coordinates of the target pixel, m is the calculated mean vector, and $\Sigma^{-1}$ is the calculated covariance.

29. The apparatus of claim 19, wherein the ridge direction extraction unit includes:

an initial direction measuring unit dividing the fingerprint region into a plurality of blocks, obtaining the gradient for each of the plurality of blocks and measuring an initial direction of each of the plurality of blocks based on the gradient;

an outlier removal unit obtaining a Euclidian norm of the gradient, for each of the plurality of blocks, by whitening the gradient and in response to the Euclidian norm, removing gradients corresponding to outliers, and storing an energy sum of the removed gradients and an energy sum of non-removed gradients;

a direction remeasuring a direction of each of the plurality of blocks after the removing of the outlier gradients;

an energy calculation unit calculating a ratio of an energy sum of non-removed gradients to an energy sum of the removed gradients if a difference between the remeasured direction and a previously measured direction is greater than a threshold;

a ridge direction determination unit interpreting the remeasured direction as the ridge direction if the ratio is not less than the energy threshold.

\* \* \* \* \*